United States Patent [19]

Zhang

[11] Patent Number: 5,692,471
[45] Date of Patent: Dec. 2, 1997

[54] METHOD AND ARRANGEMENT FOR CONTROLLING A VEHICLE

[75] Inventor: Hong Zhang, Regensburg, Germany

[73] Assignee: Robert Bosch GmbH, Stuttgart, Germany

[21] Appl. No.: 714,056

[22] PCT Filed: Feb. 15, 1995

[86] PCT No.: PCT/DE95/00182

§ 371 Date: Sep. 9, 1996

§ 102(e) Date: Sep. 9, 1996

[87] PCT Pub. No.: WO95/24550

PCT Pub. Date: Sep. 14, 1995

[30] Foreign Application Priority Data

Mar. 7, 1994 [DE] Germany .............. 44 07 475.1

[51] Int. Cl.$^6$ ............................................ F02D 41/00
[52] U.S. Cl. ........................................................ 123/350
[58] Field of Search .................................. 123/350, 333; 477/110; 364/426.04

[56] References Cited

U.S. PATENT DOCUMENTS

| | | | |
|---|---|---|---|
| 4,721,176 | 1/1988 | Kabasin et al. | 180/197 |
| 5,038,883 | 8/1991 | Kushi et al. | 180/197 |
| 5,103,928 | 4/1992 | Danner et al. | 180/197 |
| 5,213,178 | 5/1993 | Polidan et al. | 180/197 |
| 5,226,390 | 7/1993 | Nakagawa | 123/436 |
| 5,282,449 | 2/1994 | Takahashi et al. | 123/350 |
| 5,309,791 | 5/1994 | Takada et al. | 74/858 |
| 5,390,637 | 2/1995 | Yoshioka et al. | 123/333 |
| 5,391,127 | 2/1995 | Nishimura | 477/110 |
| 5,420,793 | 5/1995 | Oo et al. | 364/426.04 |
| 5,467,750 | 11/1995 | Braun et al. | 123/350 |
| 5,479,898 | 1/1996 | Cullen et al. | 123/350 |
| 5,558,178 | 9/1996 | Hess et al. | 180/197 |

FOREIGN PATENT DOCUMENTS

| | | |
|---|---|---|
| 0315198 | 5/1989 | European Pat. Off. |
| 63-263243 | 10/1988 | Japan . |

*Primary Examiner*—Raymond A. Nelli
*Attorney, Agent, or Firm*—Walter Ottesen

[57] ABSTRACT

A method and an arrangement for controlling the drive power of a vehicle are suggested wherein, on the basis of a desired value for the torque to be outputted by the drive unit, the following are influenced in the sense of preparing the desired value: the ratio of the air supplied to the drive unit and of the fuel supplied as well as the ignition angle and/or the metering of fuel to the individual cylinders. The interventions into the air/fuel ratio as well as the ignition angle and/or the metering of fuel are synchronized with each other so that the torque-changing effects of the individual interventions occur essentially at the same time point especially at the same inducting cylinder.

10 Claims, 3 Drawing Sheets

5,692,471

1

METHOD AND ARRANGEMENT FOR CONTROLLING A VEHICLE

BACKGROUND OF THE INVENTION

Such a method and such an arrangement are known from U.S. Pat. No. 5,103,928. There, to control the drive slip of a vehicle, it is suggested to determine the maximum drive torque, which can be transferred from the driven wheels, on the basis of operating variables of the vehicle and/or its drive unit and to transfer this drive torque to a central control arrangement of the internal combustion engine for adjustment. Suitable measures for processing the supplied maximum transferrable drive torque and for adjusting the torque of the drive motor in the central control arrangement are not described.

SUMMARY OF THE INVENTION

In view of the above, it is an object of the invention to provide measures for adjusting the torque of a drive motor of a vehicle by influencing power parameters of the drive motor via fuel metering, mixture composition, ignition angle and/or air supply.

The conversion of a torque desired value for a drive motor of a drive unit in an internal combustion engine is known from U.S. Pat. No. 5,558,178. This is achieved by influencing the ignition angle, by interrupting or resuming the metering of fuel to individual cylinders and/or by influencing the air supplied to the engine. A variation of the fuel/air ratio to realize a rapid torque change is not described.

According to a further aspect of the invention, measures are therefore suggested which, supplementary to other types of intervention, permit a variation of the air/fuel ratio for a spark-ignition engine to realize a rapid torque change in dependence upon a desired torque of the drive unit.

The procedure of the invention permits the realization of a torque change by changing the air/fuel ratio. The change of the air/fuel ratio for adjusting torque is used in an advantageous manner as supplement for adjusting torque via ignition angle adjustment and/or via interrupting and resuming the metering of fuel to individual cylinders (cylinder suppression).

A decisive advantage of the procedure of the invention is that the driving comfort is considerably improved by finer and more precise adjustment of the engine torque. Furthermore, an improvement of the exhaust gas emission is obtained by the change of the air/fuel ratio for fuel-injection engines compared to the exclusive use of measures for cutting off the metering of fuel. In an advantageous manner, the protection of the outlet valve, elbow and catalytic converter against overtemperature is guaranteed as a consequence of the partial avoidance of the fuel shutoff or ignition angle retard adjustment.

A continuous comfortable adjustment of the engine torque is made possible by the synchronization of the ignition intervention and/or the injection intervention with the intervention into the air/fuel ratio.

BRIEF DESCRIPTION OF THE DRAWINGS

The invention will now be more closely explained with respect to the embodiments shown in the drawing.

FIG. 1 shows an overview block diagram of a control arrangement for a vehicle; whereas.

2

Figure 3:
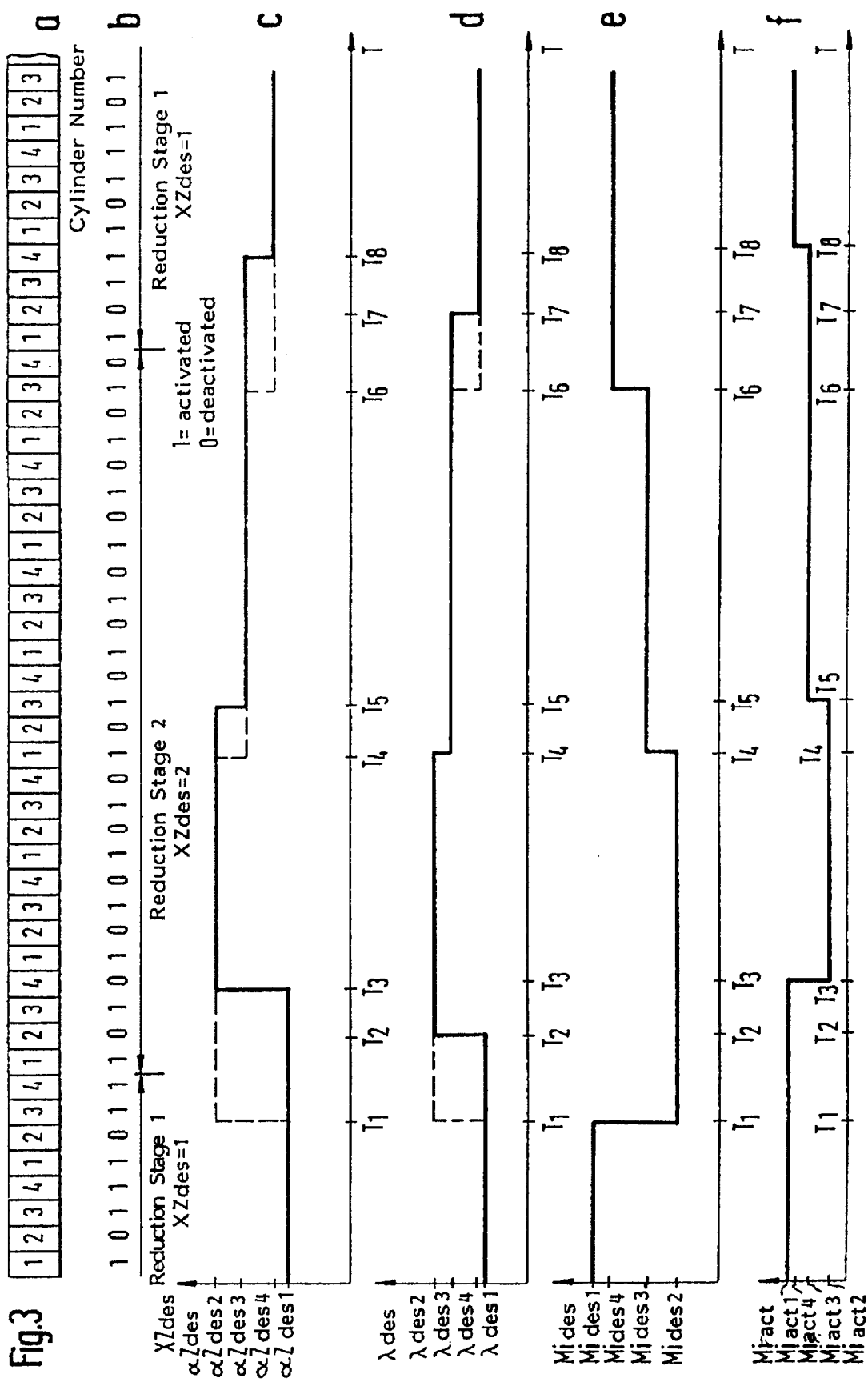

FIG. 3 shows time-dependent traces of exemplary signals with respect to which the operation of the procedure of the invention is explained in greater detail.

DESCRIPTION OF THE PREFERRED EMBODIMENTS OF THE INVENTION

Figure 1:
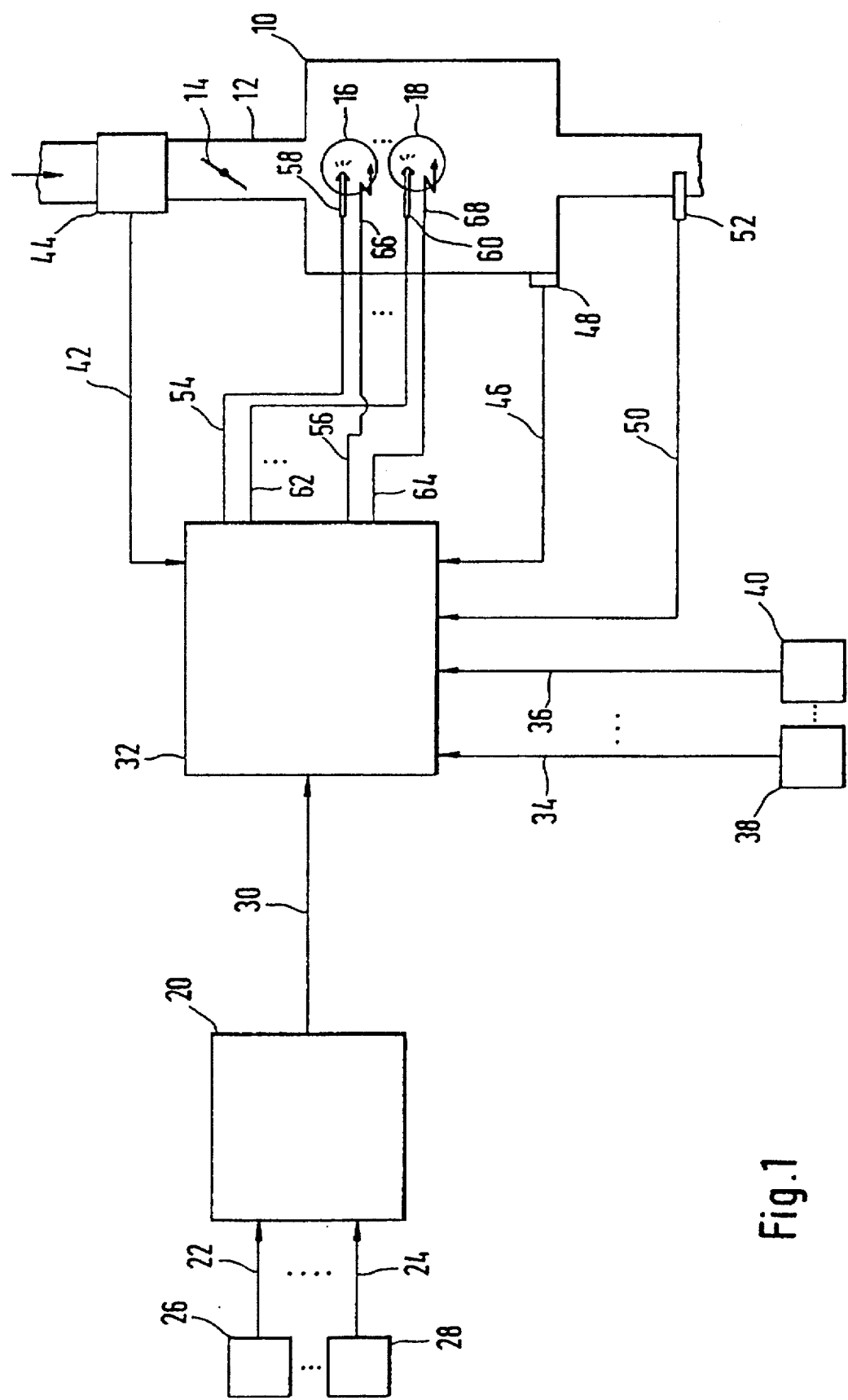

In FIG. 1, an overview block diagram of an arrangement for controlling a vehicle is shown. The arrangement includes a drive unit 10 in the form of an internal combustion engine which has an air intake system 12 having a throttle flap 14 actuable by the driver. Furthermore, two cylinders 16 and 18 of the multi-cylinder internal combustion engine 10 (spark-ignition engine) are shown in FIG. 1. The lines 22 to 24 from measuring devices 26 to 28, respectively, are connected to a first control unit 20. The control unit 20 includes an output line 30 which leads to a second control unit 32. In addition, input lines 34 to 36 from respective measuring devices 38 to 40 are connected to the second control unit 32. A line 42 from a measuring device 44 for detecting the air input to the engine 10 is connected to the control unit 32 as is a line 46 from a measuring device 48 for detecting the rpm of the engine. A line 50 from a measuring device 52 for detecting the exhaust gas composition (λ) of the engine 10 is likewise connected to the control unit 32. Output lines 54 to 56 lead to respective injection valves 58 to 60 with an injection valve being assigned to each cylinder. Devices 66 to 68 are assigned to each cylinder and output lines 62 to 64 lead to devices 66 to 68, respectively, for controlling the ignition time point.

The operation of the arrangement shown in FIG. 1 is described with respect to the example of the function of drive-slip control. The control unit 20 defines a drive-slip control system to which signals with respect to the rotational speed of the vehicle wheels are supplied via lines 22 to 24. On the basis of these signal values, the control unit 20 determines a desired value for the torque of the drive motor 10 which is to be adjusted by the control unit 32. This desired value is outputted by the control unit 20 via the line 30 to the control unit 32. This desired value is made available by the control unit 32 while utilizing the operating variables (which are supplied to the control unit 32) by influencing the metered fuel to individual cylinders and/or by influencing the ignition angle as well as by changing the composition of the air/fuel mixture in the sense of approximating the torque outputted by the engine 10.

In addition to the described function of the control unit 20, the control unit 20 can, in other advantageous embodiments, be a transmission control unit which determines the output torque to be outputted by the drive train and outputs an adjusting desired value for the torque of the drive motor via the line 30 to the control unit 32. In another embodiment, the control unit 20 can be a higher-order control unit for the common control of at least the transmission unit and the drive motor or an arrangement for limiting the maximum torque, the road speed or engine speed in one or several operating states.

The following basic interrelationships and realizations form the basis for the conversion of the desired torque value by the control unit 32. The torque, which is generated by the combustion operations in the individual cylinders, (the indicated torque Mi) is essentially dependent upon the engine speed Nmot, the engine load Tl (adjusted by the cylinder charge), the adjusted injection time Ti as well as the ignition angle αz. The torque desired value is prepared by influencing the air/fuel ratio, the fuel metered to individual cylinders and by adjusting the ignition angle. In this way, the injection time is defined by the λ-value adjusted in each case for the exhaust gas composition and the so-called reduction stage XZ. This reduction stage XZ defines the number of suppressed cylinders per complete work cycle of the engine, that is, the number of cylinders to which the fuel is interrupted. The indicated engine torque can therefore be defined by the following dependency:

$$Mi = f(Nmot, Tl, \alpha z, \lambda, XZ) \quad (1)$$

The indicated engine torque is thereby pregiven by the control unit 20 as the desired value. Accordingly, the task is then to compute the actual variables αz, λ and XZ. The basic consideration here is the breakdown of the dependencies according to equation (1) into individual functions according to physical viewpoints:

$$Mi = f1(Nmot, Tl)*f2(\Delta \alpha z)*f3(\lambda)*f4(XZ) \quad (2)$$

wherein:

$$\Delta \alpha z = \alpha zopt(Nmot, Tl, \lambda) - \alpha z \text{ and } f4(XZ) = 1 - XZ/ZZ \quad (3)$$

In equation (3), αzopt is then the optimal ignition angle determined for a maximum torque on the basis of engine rpm, engine load and exhaust gas composition and αz is the actual ignition angle adjusted on the basis of a known rpm-load characteristic field. ZZ is the maximum possible stage number for the cylinder suppression (for example, in the simplest case, for a four-cylinder engine 4).

The components of the equation (2) have physical significance. f1 corresponds to the indicated engine torque for optimal ignition angle, λ=1 (stoichiometric ratio and fuel input to all cylinders (XZ=0). f2 corresponds to the contribution of the ignition angle deviation or ignition angle adjustment to the engine torque, that is, the contribution of the deviation of the adjusted ignition angle from the optimal ignition angle. f3 identifies the torque contribution for a changed air/fuel ratio and the function f3 for λ=1 is one. f4 identifies the torque contributions via suppression of individual cylinders. This function is 1 when no cylinder is suppressed, that is, fuel is supplied to all cylinders. The functions f1 to f4 define experimentally determined characteristic fields or characteristic lines in which the absolute torque value (f1) or the relative torque change (f2 to f4 is included in dependence upon the identified variables.

The load signal Tl is determined from the signal of a hot-wire air mass sensor or from the signal of a hot-film air mass sensor or from the signal of an intake pipe pressure sensor or an air quantity sensor while considering the engine rpm.

The desired torque is made available by adjusting the variables λdes, αzdes and XZdes. These variables can be computed in accordance to various strategies. In the following, two of these strategies are explained in greater detail and have been shown to be especially suitable in the embodiments. A first strategy imparts a higher priority to the intervention into the air/fuel ratio than to the intervention into the fuel metering (cylinder suppression) and the ignition angle adjustment; whereas, a second strategy imparts a higher priority to the cylinder suppression compared to the intervention into the air/fuel ratio and the ignition angle intervention. In other embodiments, any other possible priority distribution can be selected.

For this purpose, the adjusted torque Miact must be first determined in normal operation without intervention for λ=λ0, characteristic field ignition angle αz and reduction stage XZ 0 (no cylinder suppression) via an estimate:

$$Miact = f1(Nmot, Tl)*f2(\alpha zopt - \alpha z)*f3(\lambda 0)*f4(0) \quad (4)$$

wherein:

$$f3(\lambda 0) = 1 \text{ for } \lambda 0 = 1 \text{ and } f4(0) = 1$$

The intervention into the air/fuel ratio is necessary for adjusting the desired torque Mides and shows the priority. This intervention results while considering equation (4) by solving equation (3) as follows:

$$\lambda des = f3^{-1}\{Mides*f3(\lambda 0))/Miact\} \quad (5)$$

If the desired value for the torque of the engine then deviates from the estimated value without intervention, a desired value for the adjustment of the air/fuel ratio is determined in accordance with the above equation. This desired value at least reduces the difference between the desired value and the actual value without intervention. The desired value λdes is not permitted to depart from its permissible range which is determined via a reliable firing of the cylinders. If the desired value lies outside of this permissible range, then the desired value is limited to the minimum or maximum value.

From the value λ, which is adjusted in accordance with the desired value for the air/fuel ratio, the torque contribution of this adjustment is determined with the aid of the function f3 and equation (2) is solved to determine the number of cylinders XZ to be suppressed:

$$XZdes = \{1 - Mides/(Miact*f3(\lambda)/f3(\lambda 0))\}*ZZ \quad (6)$$

If the number of reduction stages is fixed, then the possibly remaining torque difference can be compensated by changing the ignition angle on the basis of equation (2). The influence of the shift of the air/fuel ratio on the optimal ignition angle should then be considered (g(λ)). The ignition angle αzdes, which is to be adjusted, then results as a function of the adjusted reduction stage and of the torque desired value while considering the influence of the adjusted air/fuel ratio on the optimal ignition angle:

$$\alpha zdes = \alpha zopt(Nmot, Tl)*g(\lambda) - f2^{-1}\{Mides/(f1(Nmot, Tl)*f3(\lambda)*f4(XZ))\} \quad (7)$$

By sequential computation of the actuating variables, the desired torque can be adjusted by influencing the air/fuel ratio, the fuel metered to individual cylinders as well as the ignition angle to be adjusted.

If in one embodiment or in specific operating phases and operating points (such as in warm running for lower torque reduction or limiting maximum speed), no interruption of the fuel metered to individual cylinders is permitted (that is, XZdes is always 0) then, in the same manner and on the basis of the above equations, a combined intervention into the air/fuel ratio and into the ignition angle is carried out.

The actual engine torque is computed according to equation (2) from the measured or computed actual values for the ignition angle, the cylinder suppression and λ and, if required, processed.

The adjustment of the desired value for the air/fuel ratio is carried out in a preferred embodiment by correcting the injection time Ti.

Figure 2:
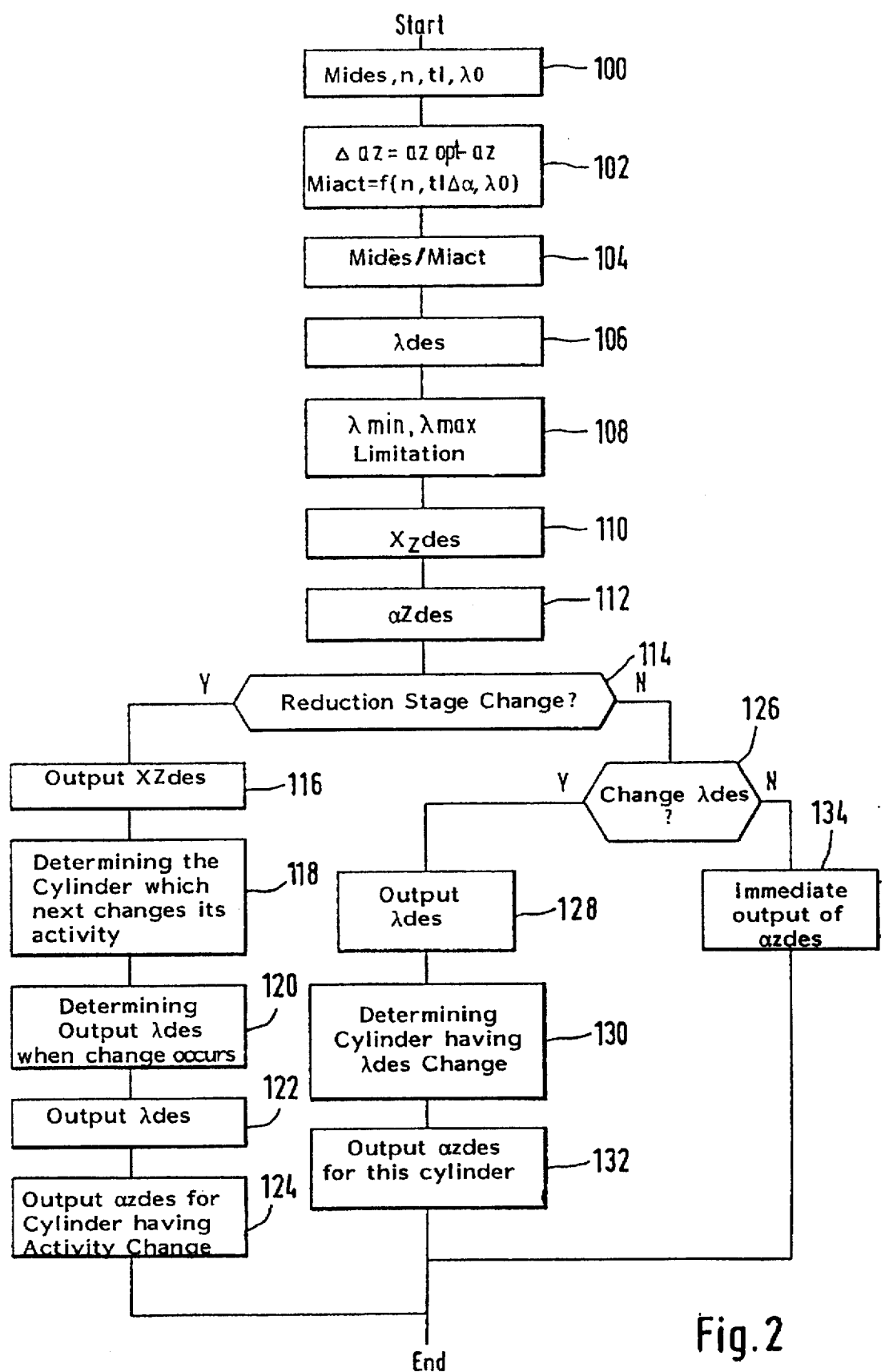
FIG. 2 shows a flowchart of a preferred embodiment of the procedure of the invention.

In addition to the above-described basic relationships, the time-dependent performance is to be considered to realize the corresponding function. In fuel injection systems, the fuel, which is to be injected into specific cylinders, in dependence upon load and rpm, is made available, that is, the fuel is injected at a specific crankshaft angle in advance of the induction stroke of the particular cylinder forward of the intake valve. The computation of the fuel quantity to be injected is therefore carried out a certain time in advance of the induction of this quantity. This quantity then represents the operating state, which is present during the intake operation, no longer precisely. In contrast thereto, the computation of the ignition angle is carried out so that it is very current and completed directly in advance of the mixture ignition. To improve the torque performance, the interventions into ignition and fuel quantity must therefore be synchronized in such a manner that a change of the ignition angle takes place only for that cylinder wherein a change of fuel quantity takes place (in the sense of a change of the air/fuel ratio or in the sense of an interruption or resumption of the metering of fuel). A realization for such a synchronization is shown in the flowchart of FIG. 2 with respect to the embodiment having prioritized air/fuel ratio intervention.

After the start of the subprogram, which takes place in synchronism with the crankshaft or is time synchronized, the desired value for the engine torque Mides, the engine rpm Nmot, the engine load Tl as well as the exhaust gas composition $\lambda 0$ are read in in the first step 100. Thereafter, in step 102, the ignition angle difference $\Delta\alpha z$ between the optimal ignition angle (which is determined in dependence upon engine rpm, engine load and $\lambda$ from a characteristic field) and the actual adjusted ignition angle $\alpha z$ is computed. Also in step 102, the actual outputted engine torque without intervention Miact is estimated from a characteristic field in dependence upon engine rpm, engine load, exhaust gas composition $\lambda 0$ and the ignition angle deviation (equation 4). In the next step 104, the ratio between the pregiven desired torque and the estimated torque without intervention is computed and in the next step 106, the desired value $\lambda$des for the adjustment of the air/fuel ratio is determined (equation 5). Thereafter, $\lambda$des is limited in step 108, if required, to a minimum value or a maximum value. In the next step 110, the reduction stage (XZdes), which is to be adjusted, is determined (equation 6) on the basis of the following: torque value without intervention, value $\lambda$ for the air/fuel ratio to be adjusted and the desired torque value as shown above. In the next step 112, the ignition angle $\alpha z$des, which is to be adjusted, is determined as a function of the following: desired torque value, torque for optimal ignition angle, value $\lambda$ and the adjusted reduction stage in accordance with the above (equation 7). In the next inquiry step 114, a check is made as to whether a change of the reduction stage compared to the previous state was computed in step 110.

If this is the case, then, in step 116, the desired value for the reduction stage change is outputted and, in the next step 118, that cylinder is determined which is next to change its activity, that is, which changes its state from the switched-off into the resumed state or from the fired state into the switched-off state. Thereafter, in step 120, the output time point for the desired value of the air/fuel ratio is determined and this is outputted at the given time point in accordance with step 122, that is, the injection pulse, which is formed at this time point for a cylinder, is correspondingly corrected. The time point is so determined that, as a consequence of the early injection of the fuel, a change in the composition of the supplied mixture only takes place for that cylinder which, according to step 118, changes its activity or that cylinder which follows such a cylinder. Correspondingly, in step 124, the ignition angle desired value for the cylinder having activity change or for the next cylinder is outputted and the subprogram is ended.

If it is detected in step 114, that no change of the reduction stage was computed, then a check is made in inquiry step 126 as to whether a change was determined in the air/fuel ratio. In this case, and in accordance with step 128, the desired value $\lambda$des is outputted and a determination is made in the next step 130 as to which cylinder is first to be ignited with the changed air/fuel ratio. The early injection of the fuel is primarily dependent upon engine rpm and engine load so that the time point can be determined on the basis of this operating data. The output of the desired value for the ignition angle adjustment takes place in accordance with step 132 for this cylinder. Thereafter, the subprogram is ended.

If it was detected in step 126 that no change in the air/fuel ratio was determined, then, in step 134, the desired ignition angle is immediately outputted and the subprogram is ended.

In summary, it can be stated that the torque intervention of each actuating variable is synchronized with the other variable or other variables. This leads to the situation that the torque change, overall, takes place essentially at the same time point and therefore no unsatisfactory performance of the engine torque takes place. This would follow when each actuating variable became effective immediately and therefore the torque change, which is caused by each actuating variable, takes place at different time points.

In the embodiment of FIG. 2, the intervention into the air/fuel ratio is provided with the highest priority. In other embodiments or in other operating phases such as in operating phases having high power requirements on the engine, it can be advantageous to assign the highest priority to the switchoff and resumption of individual cylinders. In this case (in lieu of step 106), the desired reduction stage XZdes is determined on the basis of the ratio of the desired torque to the torque without intervention. Then, in the two next steps, $\lambda$des is determined on the basis of the following: desired torque, estimated torque without intervention and the reduction stage which is to be adjusted. $\lambda$des is then limited according to step 108. The further program sequence with step 112 and the other steps is to be correspondingly applied.

As mentioned above, the functions $f2(\Delta\alpha z)$, $f3(\lambda)$ and $g(\lambda)$ are experimentally determined characteristic fields or characteristic lines in a preferred embodiment. In another mathematical description and in another advantageous embodiment, there are polynomes of the first and/or second order and/or higher orders with the constants of the polynome being dependent upon engine rpm and engine load.

In addition to the preferred description of the equations (2) and (7) as multiplication, a breakdown into functions in the form of an addition is likewise advantageous.

Typical time-dependent traces are shown in FIG. 3 to show the operative effects of the procedure of the invention.

In FIG. 3a, the cylinders of a four-cylinder engine are shown and, in FIG. 3b, the activities of these cylinders are shown. Here, the numeral 1 shows a fired cylinder and 0 shows a switched-off cylinder. FIG. 3c shows the time-dependent trace of the ignition angle and FIG. 3d shows the time-dependent trace of the air/fuel ratio. FIG. 3e shows the time-dependent trace of the engine desired torque and FIG. 3f shows the time-dependent trace of the engine torque itself. The illustration in FIG. 3 proceeds from an exemplary operating state wherein the fuel metered to one cylinder is already injected during the intake stroke of the previous cylinder. Stated otherwise, in the exemplary operating state, the early injection of the fuel takes place in advance by a half revolution of the camshaft or one revolution of the crankshaft.

Up to a time point T1, the value Mides1 is established as the desired value for the engine torque. This value is realized by the reduction stage 1 (in which the cylinder 2 is suppressed and the other cylinders are fired) by the desired ignition angle αzdes1 and the air/fuel ratio λ1. At time point T1, the desired engine torque value changes to the value Mides2. For realizing this desired torque Mides2, the following is computed: the reduction stage 2 (in which additionally the cylinder 4 is suppressed), the ignition angle αzdes2 and λ2 at time point T1. As a consequence of the early introduction of the fuel, the change in reduction stage is realized only at time point T3 (at which the newly suppressed cylinder 4 intakes). If the ignition angle change as well as the change of the air/fuel ratio would be carried out at time point T1, this would have a torque increasing effect as a consequence in the embodiment shown at time point T1 and at time point T2 because the change in the ignition angle and in the air/fuel ratio compensate the torque reduction which is too great by changing the reduction stage. A torque increase starting at time point T1 is unwanted so that the realization of the λ change and the ignition angle change is delayed. At time point T2, when the fuel for the newly suppressed cylinder 4 would be injected, the computed injection pulse is corrected by λdes. This has the consequence that, starting with cylinder 4 after the time point T3, an air/fuel ratio λ2 is adjusted. Ignition angle changes become immediately effective so that the change of the ignition angle to the value αzdes2 is carried out at time point T3 (at which time the newly suppressed cylinder 4 intakes). As a result, starting with time point T3, a reduction of the engine torque to the value Mi2 results in accordance with the pregiven desired value without an unwanted increase in the engine torque in advance of the time point T3. The interventions into the following are therefore synchronized: fuel metering, ignition angle and air/fuel ratio.

A further example shows a change of the engine torque without a change of the reduction range being necessary. At time point T4, the desired torque is increased from the value Mides2 to the value Mides3. Therefore, at this time point and to realize the engine torque, an ignition angle change to the value αzdes3 and the change of the air/fuel ratio to the value λ3 with torque reducing effect are computed. Since the torque change is so small that a change of the reduction stage is not necessary, the λ change can become effective at time point T4. The actual computed injection pulse is corrected. In the embodiment shown, λdes is changed at time point T4 during the intake stroke of the cylinder 1. This change becomes effective for cylinder 3. For this reason, the change of the ignition angle is delayed up to time point T5 at which the cylinder 3 inducts. The result is an increase of the engine torque at time point T5 to the value Mi3 without a torque change operating against the increase having taken place before the time point T5. The intervention into the air/fuel ratio and the ignition angle intervention are therefore synchronized.

At time point T6, a further increase of the engine desired torque value to the value Mides4 is pregiven. As with respect to time point T1, this change leads to a change of the reduction stage wherein the deactivated cylinder 4 is again activated. The effect of the reduction stage change on the engine torque takes place only at time point T8 during the induction stroke of the cylinder 4. For this reason, the changes in the air/fuel ratio and in the ignition angle are correspondingly delayed. The change in the air/fuel ratio takes place at time point T7 when the fuel provided for cylinder 4 is injected; whereas, the immediate effective ignition angle change is carried out only at time point TS. The result is a change of the torque at time point T8 to the value Mi4. Here too, the three position interventions are synchronized with each other.

In FIG. 3, the effects of the intervention into the air/fuel ratio and into the ignition angle are each shown in the same direction. In other advantageous embodiments, these work in opposite directions in that, for example, the extent of the change in the air/fuel ratio is so selected because of reasons related to the exhaust gas (for example, a jump over of regions with toxic exhaust gas components), that the engine torque is reduced too far and is compensated by corresponding torque increasing interventions into the ignition angle or vice versa. In addition to the above interventions via injection suppression, air/fuel ratio and injection angle, the realization of the desired torque is carried out by influencing the air supply, for example, via a throttle flap or a bypass valve.

I claim:

1. A method of controlling a torque of an internal combustion engine to a changeable pregiven desired value (Mides), the method comprising the steps of:

controlling at least one of the following parameters which influence said torque of said engine:

(a) air/fuel ratio (λ);

(b) ignition angle (αz); and, (c) number of deactivated cylinders (XZ);

so that said torque approaches said desired value (Mides) thereof by performing the following additional steps:

forming a desired value (λdes, αzdes, XZdes) for said at least one of said parameters (λ, αz, XZ) in dependence upon said desired value (Mides) of said torque, the engine load (tl) and the respective settings of said air/fuel ratio (λ), said ignition angle (αz) and said number of deactivated cylinders (XZ); and, controlling said at least one of said parameters (λ, αz, XZ) to said at least one of said desired values (λdes, αzdes, XZdes) thereby causing the torque of said engine to approach said desired value (Mides).

2. The method of claim 1, wherein, based on said desired value (Mides) of said torque, a corresponding input value is computed for controlling at least one of the following: air supply, metering of fuel and ignition.

3. The method of claim 1, wherein influencing the ignition angle, metering of fuel and air/fuel ratio are so synchronized with each other that their effects on the torque of the drive unit become effective each time for the same inducting cylinder.

4. The method of claim 1, wherein the intervention into the metering of fuel is realized by suppressing the metering of fuel to individual predetermined cylinders and by adjusting the air/fuel ratio.

5. The method of claim 1, wherein: starting from the desired value for the torque, the engine rpm and the engine load, the adjusted ignition angle as well as the adjusted air/fuel ratio, first a desired value for the air/fuel ratio and then the number of deactivated cylinders and then the change of the ignition angle is determined in such a manner that the desired value for the torque is adjusted.

6. The method of claim 1, wherein: starting from the desired value for the following: the torque, the engine rpm and the engine load of the adjusted ignition angle as well as of the adjusted air/fuel ratio, first the number of deactivated cylinders and then a desired value for the air/fuel ratio and then the ignition angle change is determined in such a manner that the desired value for the torque is adjusted.

7. The method of claim 1, wherein the desired value (λdes) for the air/fuel ratio is adjusted for a spark-ignition engine by correcting the fuel quantity to be injected.

8. The method of claim 1, wherein the desired value (Mides) of said torque is outputted by a control apparatus for controlling drive slip in the case of an impermissibly high slip at least at one of the drive wheels, or is outputted by a transmission control unit or an arrangement for limiting the torque, rpm or road speed when a limit value is exceeded.

9. The method of claim 1, wherein the intervention into the air/fuel ratio ($\lambda$) and the ignition angle ($\alpha z$) is undertaken when the intervention into the metering of fuel to individual cylinders (cylinder deactivation) is forbidden.

10. An arrangement for controlling a toque of an internal combustion engine to a changeable pregiven desired value (Mides), the arrangement comprising:

means for controlling at one of the following parameters which influence said torque of said engine:
 (a) air/fuel ratio ($\lambda$);
 (b) ignition angle ($\alpha z$); and
 (c) number of deactivated cylinders (XZ);

means for forming a desired value ($\lambda$des, $\alpha z$des, XZdes) for said at least one of said parameters ($\lambda$, $\alpha z$, XZ) in dependence upon said desired value (Mides) of said torque, the engine load (tl) and respective settings of said air/fuel ratio ($\lambda$), said ignition angle ($\alpha z$) and said number of deactivated cylinders (XZ); and, means for controlling said at least one of said parameters ($\lambda$, $\alpha z$, XZ) to said at least one of said desired values ($\lambda$des, $\alpha z$des, XZdes) thereby causing the torque of said engine to approach said desired value (Mides).

* * * * *

UNITED STATES PATENT AND TRADEMARK OFFICE
CERTIFICATE OF CORRECTION

PATENT NO. : 5,692,471
DATED : December 2, 1997
INVENTOR(S) : Hong Zhang

It is certified that error appears in the above-identified patent and that said Letters Patent is hereby corrected as shown below:

In column 3, line 31: delete "ratio" and substitute -- ratio) -- therefor.

In column 3, line 42: delete "f4" and substitute -- f4) -- therefor.

In column 7, line 64: delete "TS" and substitute -- T8 -- therefor.

In column 8, line 21: delete "(a air" and substitute -- (a) air -- therefor.

In column 9, line 9: delete "toque" and substitute -- torque -- therefor.

In column 9, line 12: between "at" and "one", insert -- least --.

Signed and Sealed this

Thirtieth Day of June, 1998

Attest:

BRUCE LEHMAN

*Attesting Officer*   *Commissioner of Patents and Trademarks*